3,560,443
SELECTED 4,4' - METHYLENE BIS(2-ALKYL-6-METHYLANILINES) AS CURING AGENTS FOR EPOXY RESINS
Norman K. Sundholm, Middlebury, Conn., assignor to Uniroyal, Inc., New York, N.Y., a corporation of New Jersey
No Drawing. Original application Mar. 28, 1967, Ser. No. 626,396. Divided and this application Sept. 23, 1968, Ser. No. 798,484
The portion of the term of the patent subsequent to Dec. 2, 1986, has been disclaimed and dedicated to the Public
Int. Cl. C08g 30/14
U.S. Cl. 260—47          4 Claims

ABSTRACT OF THE DISCLOSURE

Epoxy resins are cured with 4,4'-methylenebis(2-alkyl-6-methylanilines) having the structural formula:

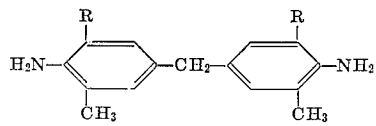

where R is an ethyl group or a secondary alkyl group having 3 to 6 carbon atoms.

RELATION TO OTHER APPLICATION

This is a division of copending application Ser. No. 626,396, filed Mar. 28, 1967 and now abandoned.

BACKGROUND OF THE INVENTION

This invention relates to a novel process for curing epoxy resins, epoxy resin-curing agent blends and to a new class of aromatic diamines. More particularly, the invention relates to the use of epoxy resin curing agents which have longer pot lives than the commonly used 4,4'-methylenedianiline and metaphenylenediamine, and which readily blend with liquid resins because the curing agents are either liquid, or solids which readily dissolve in the resins at processing temperatures.

The epoxy resins may be polymeric or monomeric and are mixtures of molecules containing the epoxy group.

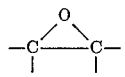

which serves as a point for chain extension and crosslinking. On the average more than one epoxy group is present per molecule. The concentration of epoxy groups is generally denoted by the term "epoxide equivalent," which is the number of grams of resin containing one gram equivalent of epoxide.

Until epoxy resins are cured, they have no useful structural property. After cure, they become tough, hard, infusible and resistant to structural distortion at elevated temperatures.

A description of the synthesis, characterization, curing and application of epoxy resins is well presented in the text Epoxy Resins by H. Lee and K. Neville, McGraw-Hill Book Company, Inc., 1957. Most of the commercial resins are the epoxy ethers formed by the reaction of epichlorohydrin with a polyhydric phenol or a polyalcohol in the presence of an agent, such as sodium hydroxide. The polyhydric phenol used to the greatest extent is 2,2-bis(4-hydroxyphenyl)propane, commonly known as bisphenol A. However, the resin need not be an epoxy ether but may be a polyepoxide formed by the epoxidation of a polyene, such as dicyclopentadiene and 4-vinylcyclohexene, a homopolymerized diene, such as polybutadiene, a glyceride of an unsaturated fatty acid, such as soybean oil, etc.

Epoxies may be cured in two ways: catalysis or copolymerization. In catalytic curing, the epoxy molecules react directly with each other in a reaction started by a catalyst; such systems are said to be homopolymerized.

Copolymerized epoxies have hardeners mixed into the resins. These hardeners contain reactive groups which unite with the epoxy groups and become a vital part of the cured material. Epoxy resin hardener systems are said to be heteropolymerized.

A variety of chemical compounds act as curing agents for epoxy resins. The two major classes are the organic amines and various derivatives thereof, and organic dibasic and polybasic acids and acid anhydrides. Examples of the amine class are 4,4'-methylenedianiline, metaphenylenediamine, 4,4'-diaminodiphenyl sulfone, diethylenetriamine, diethylaminopropylamine, piperidine, triethylamine, benzyldimethylamine, 2,4,6 - tris(dimethylaminomethyl)phenol and its tri-2-ethylhexoate salt, dicyandiamide, boron trifluoride-monoethylamine complex, and triethanolamine borate. Examples of the acid and anhydride class are oxalic acid, phthalic anhydride, hexahydrophthalic anhydride, dodecenyl succinic anhydride and pyromellitic dianhydride.

In commercial practice the curing agent is usually mixed as a liquid with the liquid epoxy resin, the resin being heated if necessary. The blending operation is facilitated if the curing agent is a liquid or low-melting solid. It is also advantageous for a resin blend containing the curing agent to have a long pot life. The latter is particularly true if the curing agent is added to an epoxy resin which requires heating to make it sufficiently liquid for easy blending, because, with a long pot life, cure may be avoided during the blending and application (casting, coating, laminating, molding, etc.) operations. The blending of the curing agent and epoxy resin desirably produces little heat. Otherwise, the heat generated from the curing reaction in large batches may become excessive and uncontrollable.

It is an object of this invention to provide novel chemical compounds.

It is another object of the present invention to provide improved curing agents.

It is a further object of this invention to provide mixtures of epoxy resins and curing compounds which have long pot lives.

It is a still further object of this invention to provide an improved method of curing epoxy resins.

Other objects, features and advantages will be apparent from the following description of the invention.

SUMMARY OF THE INVENTION AND DESCRIPTION OF THE PREFERRED EMBODIMENT

Certain organic compounds have been found which among other favorable properties impart long pot lives to epoxy resin blends and give the epoxy resins cured with them good resistance to heat distortion. Such compounds are 4,4'-methylenebis-(2-alkyl-6-methylanilines) having the structural formula:

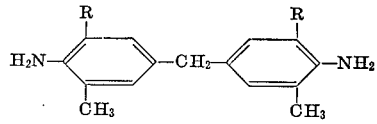

where R is an ethyl group or a secondary alkyl group containing 3 to 6 carbon atoms. The preferred groups are ethyl, isopropyl, sec-butyl, and 2-hexyl.

The compounds may be synthesized by the condensation of the corresponding 2,6-disubstituted anilines with formaldehyde in the presence of dilute mineral acid, using greater than a 2 to 1 molar ratio of 2,6-disubstituted aniline to formaldehyde. The substituted anilines, if not available, may be prepared by the alkylation of o-toluidine with the appropriate olefin in the presence of aluminum and aluminum chloride using the procedure described by Stroh, Ebersberger, Haberland and Hahn on page 240 of the text Newer Methods of Preparative Organic Chemistry, edited by W. Foerst, Academic Press, 1963.

It is a feature of the present invention that the blends made with the amine curing agents of the present invention and epoxy resins have markedly longer pot lives than afforded by the commonly used amine curing agents, 4,4′-methylenedianiline and meta-phenylenediamine. For instance, 4,4′-methylenebis(2-sec-butyl-6-methylaniline) and resin blends have over ten times the pot life of resin blends made with 4,4′-methylenedianiline.

It is still another feature of the present invention that the melting points of the amine compounds of this invention are lower than the commonly used amine curing agent 4,4′-methylenedianiline, and some are lower even than meta-phenylenediamine.

Specific examples of the practice of the invention are given below in order to disclose more clearly the nature of the invention. It should be understood, however, that this is done solely by way of example and is intended neither to delineate the scope of the invention nor limit the ambit of the appended claims.

EXAMPLE I

Preparation of 4,4′-methylenebis(2-sec-butyl-6-methylaniline)

To a stirred solution of 163 grams (1 mole) of 2-sec-butyl-6-methylaniline, 83.3 ml. of concentrated hydrochloric acid and 750 ml. of water at 60° C. were added 30.3 grams (0.375 mole) of 37% formaldehyde during 1 hour. The solution was heated at 60° C. for 3 hours, and then 65 grams of 28–30% aqueous ammonia were added. The oil was separated and subjected to steam distillation to remove unreacted 2-sec-butyl-6-methylaniline. The residue was dried with solid potassium hydroxide and distilled. The fraction boiling at 190–192° C. (0.5 mm.) was collected; it consisted of 125 grams of light tan oil.

Analysis.—Calculated for $C_{23}H_{34}N_2$ (percent): C, 81.66; H, 10.06; N, 8.28. Found (percent): C, 82.04; H, 10.00; N, 8.19.

EXAMPLE II

Preparation of 4,4′-methylenebis(2-isopropyl-6-methylaniline)

The procedure was the same as that of Example I using 253 grams (1.70 moles) of 2-isopropyl-6-methylaniline, 142 ml. of concentrated hydrochloric acid, 1.2 liters of water and 51.5 grams (0.64 mole) of 37% formaldehyde. The product obtained boiled at 180–182° C. (0.2 mm.) and consisted of 193.5 grams of light tan oil which slowly solidified on long standing. Recrystallization from ethanol gave colorless crystals melting at 73–74° C.

Analysis.—Calculated for $C_{21}H_{30}N_2$ (percent): C, 81.29; H, 9.68; N, 9.03. Found (percent): C, 81.29; H, 9.77; N, 9.09.

EXAMPLE III

Preparation of 4,4′-methylenebis(2-ethyl-6-methylaniline)

The procedure was the same as that of Example I using 313.2 grams (2.32 moles) of 2-ethyl-6-methylaniline, 193.3 ml. of concentrated hydrochloric acid, 1.5 liters of water and 70.5 grams (0.87 mole) of 37% formaldehyde. The product consisted of 256 grams of off-white solid melting at 80–85° C. Recrystallization from ethanol gave 190 grams of colorless crystals melting at 84–85° C.

Analysis.—Calculated for $C_{19}H_{26}N_2$ (percent): C, 80.85; H, 9.22; N, 9.93. Found (percent): C, 80.39; H, 9.18; N, 10.17.

EXAMPLE IV

Preparation of 4,4′-methylenebis[2-(2-hexyl)-6-methylaniline]

2-(2-hexyl)-6-methylaniline was prepared from o-toluidine and 1-hexene by the procedure given in the Stroh, et al. reference cited above. The product was obtained as a colorless oil boiling at 71–72° C. (0.2 mm.). The procedure for the preparation of the diamine was the same as that of Example I using 152.8 grams (0.80 mole) of 2-(2-hexyl)-6-methylaniline, 66.7 ml. of concentrated hydrochloric acid, 500 ml. of water and 24.3 grams (0.30 mole) of 37% formaldehyde. The product consisted of 116.2 grams of pale yellow oil boiling at 191–193° C. (0.2 mm.).

Analysis.—Calculated for $C_{27}H_{42}N_2$ (percent): C, 82.23; H, 10.66; N, 7.11. Found (percent): C, 81.70; H, 10.88; N, 7.12.

EXAMPLE V

Tests as epoxy resin curing agents

The compounds of Examples I–IV and two commonly used diamine curing agents were tested as curing agents for epoxy resins using two typical commercial resins and an experimental resin. One commercial resin was Epon 828, derived from epichlorohydrin and bisphenol A, having an epoxide equivalent of 188 and an approximate average molecular weight of 380.

The equivalent weight of each of the new curing agents, the weight in grams that reacts stoichiometrically with 188 grams of Epon 828, was calculated by dividing the molecular weight of the curing agent by 4 since each of the 4 hydrogen atoms attached to the nitrogen atoms can react with one epoxy group. Calculations were made for weight of curing agent and resin required to give a mixture weighing about 40 grams. For example, 13.5 grams of 4,4′-methylenebis(2-sec-butyl-6-methylaniline) and 30.0 grams of Epon 828 were used.

The weighed quantity of resin heated to 80° C. was added to the weighed quantity of curing agent heated to 80° C. The mixture was blended, centrifuged to de-aerate it and poured into a mold having inside dimensions of 7 x ½ x ½ inches. The resin-curing agent blends were cured by heating at 85° C. for 2 hours followed by 16 hours at 150° C. The cured bars were removed and tested for heat-distortion temperature using the procedure of ASTM D648–56. The results are given in Table I, below.

The same test was run using an experimental resin having an epoxide equivalent of 263, and prepared from epichlorohydrin and bisphenol A according to the procedure of Example I of U.S. Pat. 2,651,589.

The same test was repeated using D.E.N. 431, an epoxy novolac resin having an epoxide equivalent of 175. The results are given in Table I.

The pot life of each of the new curing agents was determined in Epon 828. Ten grams of resin at 100° C. were added to the equivalent amount of curing agent at 100° C. After mixing, the blends were placed in an oven at 100° C. and the time required for them to become unpourable was determined. The results are given in Table I.

The pot lives of the curing agents of this invention are longer than those of 4,4′-methylenedianiline and meta-phenylenediamine, which, under the conditions described, were 25 and 14 minutes, respectively. The peak exothermic values were 127° C. and 146° C. for 4,4′-methylenedianiline and meta-phenylenediamine, respectively, while the four new curing agents of Examples I–IV showed only minor exothermic values of approximately 102° C. The properties, for which data are presented in Table I, permit the use of longer working times and larger batches of the resin-curing agent mixtures in the case of the curing agents of the present invention.

The heat-distortion temperatures obtained with the curing agents are good. The heat-distortion temperatures obtained with 4,4'-methylenebis(2-ethyl-6-methylaniline) and 4,4'-methylenebis(2-isopropyl-6-methylaniline) in Epon 828 are equivalent to those obtained with 4,4'-methylenedianiline and meta-phenylenediamine.

TABLE I

| Diamine | Heat distortion temperature, ° C. | | | Pot life, minutes | Melting point, ° C. |
|---|---|---|---|---|---|
| | In Epon 828 | In experimental resin | In D.E.N. 431 | | |
| 4,4'-methylenedianiline | 165 | 129 | 134 | 25 | 93 |
| Meta-phenylenediamine | 167 | | 157 | 14 | 63 |
| 4,4'-methylene-bis(2-ethyl-6-methylaniline) | 166 | | 147 | 220 | 84–85 |
| 4,4'-methylene-bis(2-isopropyl-6-methylaniline) | 168 | | 165 | 220 | 73–74 |
| 4,4'-methylene-bis(2-sec-butyl-6-methylaniline) | 153 | 121 | 146 | 290 | (¹) |
| 4,4'-methylene-bis[2-(2-hexyl)-6-methylaniline] | 140 | | 124 | 305 | (¹) |

¹ These compounds are liquid at room temperature, 20–25° C.

It is to be understood that various compounding ingredients, other than the curing agent, may be blended with the epoxy resin. Such other ingredients include diluents, fillers, resinous modifiers, plasticizers and flexibilizers. The curing temperature is in the range of about 60–200° C.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

Having thus described my invention, what I claim and desire to protect by Letters Patent is:

1. A curable epoxy resin composition comprising an epoxy resin containing, on the average, more than one 1,2-epoxide group per molecule and a curing agent consisting essentially of a compound having the structural formula:

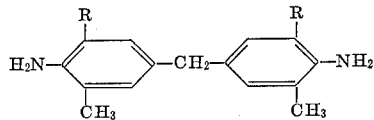

where R is a secondary alkyl group containing 3 to 6 carbon atoms.

2. A curable epoxy resin composition as defined in claim 1 wherein R is at least one member selected from the class consisting of isopropyl, secbutyl and 2-hexyl groups.

3. A cured epoxy resin composition prepared by the steps of:
(A) Mixing an epoxy resin containing, on the average, more than one 1,2-epoxide group per molecule and a curing agent consisting essentially of a compound having the structural formula:

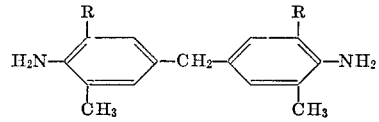

where R is a secondary alkyl group containing 3 to 6 carbon atoms; and
(B) Heating the mixture at curing temperatures until cured.

4. A cured epoxy resin composition as defined in claim 3 where R is at least one member selected from the class consisting of isopropyl, secbutyl and 2-hexyl groups.

References Cited
UNITED STATES PATENTS 3,322,810  5/1967  Olin _____ 260—570
2,891,927  6/1959  Philipson _____ 260—47EpCN

OTHER REFERENCES

Epoxy Resins by Lee and Neville, 1957 (pp. 104–105).

WILLIAM H. SHORT, Primary Examiner
T. E. PERTILLA, Assistant Examiner

U.S. Cl. X.R.
260—2, 59